US008658308B2

(12) United States Patent
Hong

(10) Patent No.: US 8,658,308 B2
(45) Date of Patent: Feb. 25, 2014

(54) POUCH-TYPE SECONDARY BATTERY WITH INSULATING MEMBER AND ALIGNMENT MARK ON CASE

(75) Inventor: Ki-Sung Hong, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 0 days.

(21) Appl. No.: 13/555,229

(22) Filed: Jul. 23, 2012

(65) Prior Publication Data
US 2013/0149601 A1 Jun. 13, 2013

(30) Foreign Application Priority Data
Dec. 9, 2011 (KR) ........................ 10-2011-0132079

(51) Int. Cl.
*H01M 2/08* (2006.01)
(52) U.S. Cl.
USPC ............ 429/185; 429/162; 429/163; 429/177
(58) Field of Classification Search
USPC .................................. 429/185, 162–163, 177
See application file for complete search history.

(56) References Cited

U.S. PATENT DOCUMENTS

| 6,051,338 A * | 4/2000 | Miyazaki et al. .............. 429/211 |
| 2004/0038125 A1 * | 2/2004 | Kim et al. ...................... 429/162 |
| 2007/0264535 A1 * | 11/2007 | Lee et al. ........................... 429/7 |
| 2009/0258290 A1 * | 10/2009 | Lee et al. ....................... 429/163 |

FOREIGN PATENT DOCUMENTS

| KR | 10-0696811 B1 | 3/2007 |
| KR | 10-0719731 B1 | 5/2007 |
| KR | 10-0956397 B1 | 4/2010 |

* cited by examiner

*Primary Examiner* — Carlos Barcena
*Assistant Examiner* — Michael Dignan
(74) *Attorney, Agent, or Firm* — Lee & Morse, P.C.

(57) ABSTRACT

A secondary battery may include an electrode assembly, the electrode assembly including first and second electrode plates and a separator interposed between the electrode plates; a battery case, the battery case including an accommodating part and a sealing part formed along an edge of the accommodating part, the accommodating part accommodating the electrode assembly; an insulating member attached to the sealing part, the insulating member covering and insulating the sealing part; and an alignment mark on at least one region of the sealing part, the alignment mark identifying a position on the sealing part at which a predetermined portion of the insulating member is aligned, wherein a non-insulating part of the sealing part extends past the insulating member.

20 Claims, 3 Drawing Sheets

POUCH-TYPE SECONDARY BATTERY WITH INSULATING MEMBER AND ALIGNMENT MARK ON CASE

BACKGROUND

1. Field

An aspect of the embodiments relates to a secondary battery.

2. Description of the Related Art

Recently, secondary batteries have been used as power sources for portable electronic devices. As the portable electronic devices are used in various fields, requirements of the secondary batteries are rapidly increasing. Further, as the secondary batteries are rechargeable, they can be used a plurality of times. Thus, the secondary batteries are economically and environmentally efficient. Accordingly, there is increased usage of the secondary batteries.

On the other hand, the secondary batteries include a material such as lithium metal, which has high reactivity. Therefore, the secondary batteries may be less safe when the secondary batteries are treated. Accordingly, various studies have been conducted to improve the safety of the secondary batteries.

SUMMARY

One or more embodiments may provide a secondary battery including: an electrode assembly, the electrode assembly including first and second electrode plates and a separator interposed between the electrode plates; a battery case, the battery case including an accommodating part and a sealing part formed along an edge of the accommodating part, the accommodating part accommodating the electrode assembly; an insulating member attached to the sealing part, the insulating member covering and insulating the sealing part; and an alignment mark on at least one region of the sealing part, the alignment mark identifying a position on the sealing part at which a predetermined portion of the insulating member is aligned, wherein a non-insulating part of the sealing part extends past the insulating member. The non-insulating part may include a region of the sealing part physically fastened to a device. The non-insulating part may be outside of the alignment mark.

The secondary battery may further include an adhesive member interposed between the sealing part and the accommodating part, the adhesive member attaching the sealing part and the accommodating part to each other. The adhesive member may include an insulative double-faced tape, and a length of the adhesive member may be shorter than a length of the sealing part. A length of the insulating member may be shorter than a length of the sealing part.

The alignment mark may include at least two alignment marks respectively formed at upper and lower sides of the sealing part. The alignment mark may have a shape of a dotted line.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
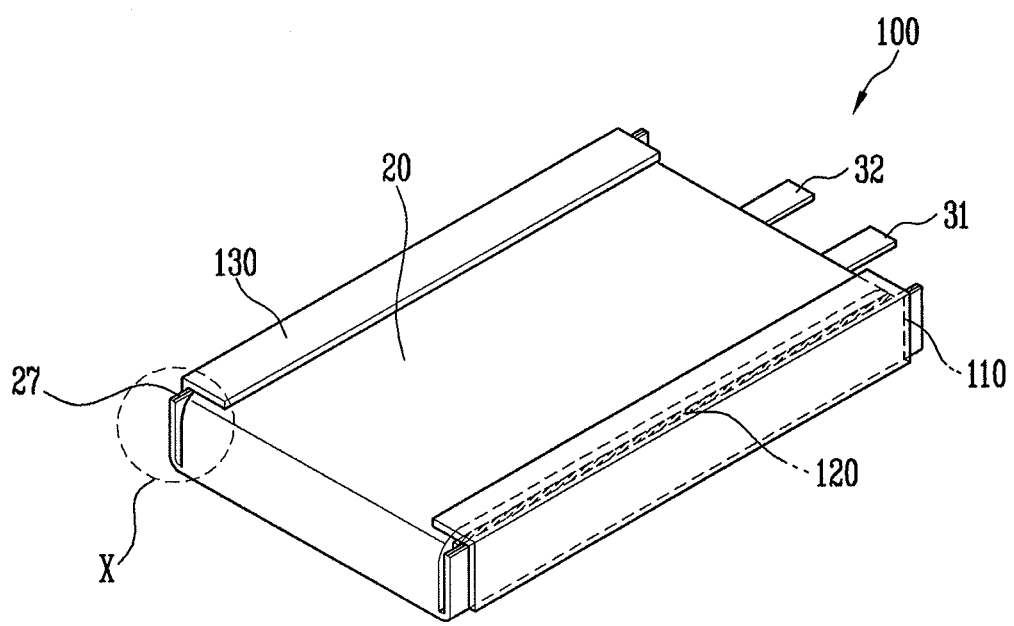
FIG. 1 illustrates a perspective view of a pouch-type secondary battery according to an embodiment.

Korean Patent Application No. 10-2011-0132079, filed on Dec. 9, 2011, in the Korean Intellectual Property Office, and entitled: "Secondary Battery" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
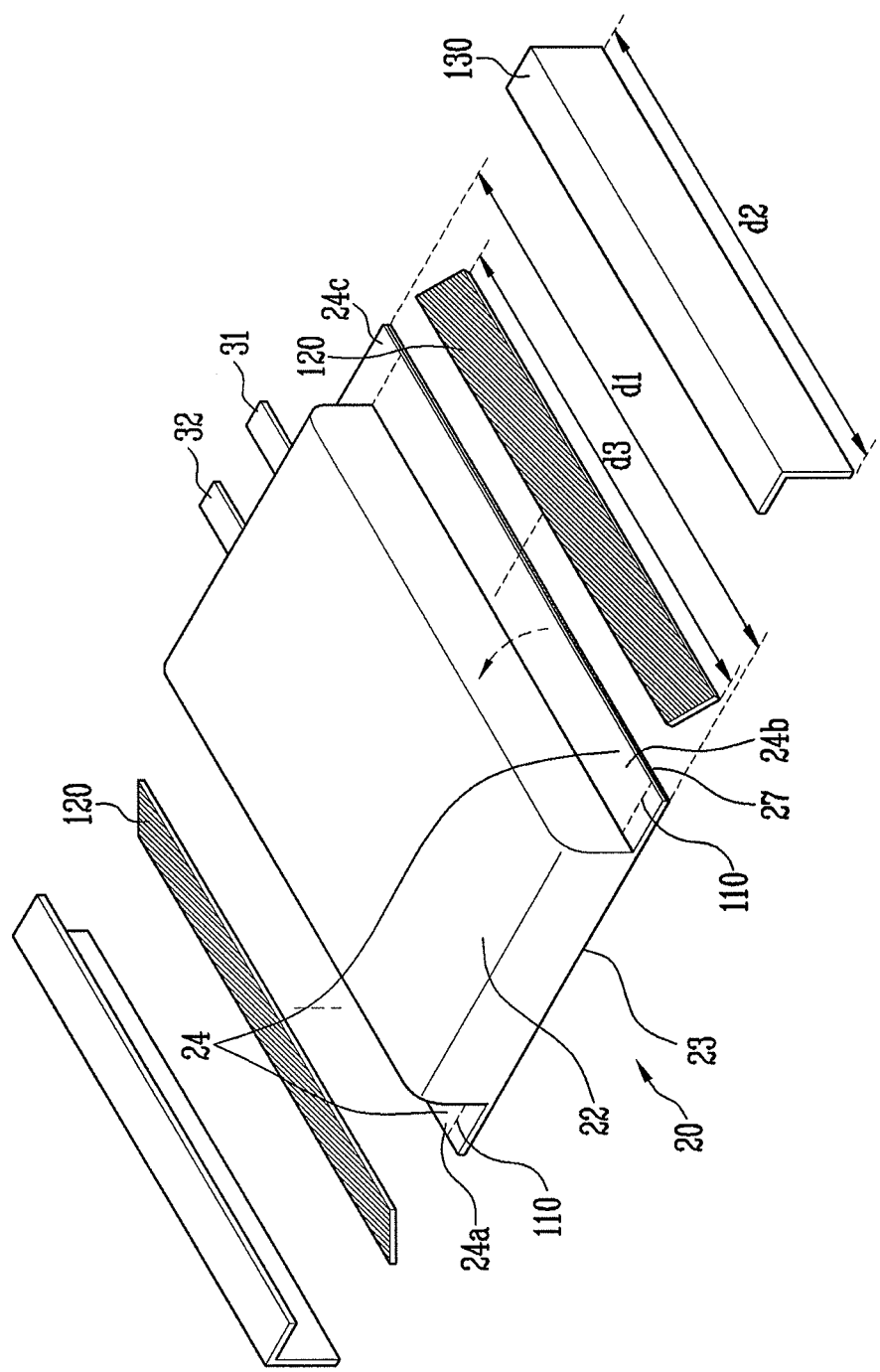
FIG. 2 illustrates an exploded perspective view of FIG. 1.
Figure 3:
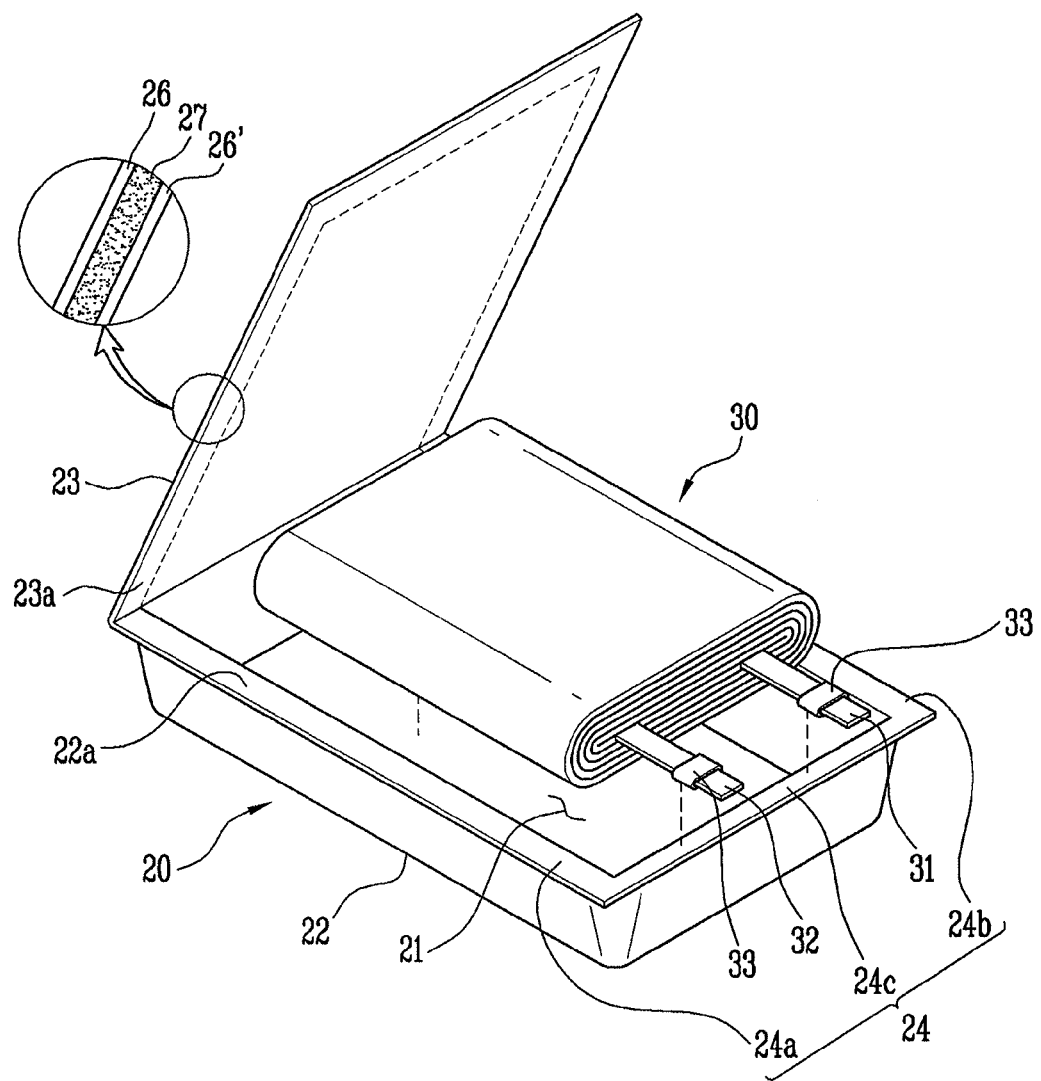
FIG. 3 illustrates a perspective view showing a battery case and an electrode assembly.

FIG. 1 illustrates a perspective view of a pouch-type secondary battery according to an embodiment. FIG. 2 illustrates an exploded perspective view of FIG. 1. FIG. 3 illustrates a perspective view showing a battery case and an electrode assembly.

Referring to FIGS. 1 to 3, the pouch-type secondary battery 100 according to the embodiments may include an electrode assembly 30, a battery case 20 and an insulating member 130. The electrode assembly 30 may include first and second electrode plates and a separator interposed between the first and second electrode plates. The battery case 20 may include an accommodating part 21 in which the electrode assembly 30 may be retained, and a sealing part 24, provided along an edge of the accommodating part 21. The insulating member 130 may be attached to the sealing part 24. The insulating member 130 may cover the sealing part 24 so as to insulate the sealing part 24.

The sealing part 24 may extend orthogonally from the accommodating part 21 in a first position and may be bent toward the accommodating part 21 in a second position. In the second position, the sealing part 24 may be attached to the accommodating part 24 by an adhesive member 120 interposed between the sealing part 24 and the accommodating part 21. The adhesive member 120 may be an insulative double-faced tape.

The pouch-type secondary battery 100 may include the sealing part 24. The insulating member 130, described above, may be configured to cover the sealing part 24 so as to insulate the sealing part 24. As such, the insulating member 130 may help avoid a short circuit. More specifically, the sealing part 24 may include a metal layer 27 with an exposed edge surface. The insulating member 130 may be configured to cover the sealing part 24 and surround the exposed edge surface of the sealing part 24 for the purpose of insulating the metal layer 27.

At least one side of the sealing part 24 may include an alignment mark 110. The alignment mark 110 may identify a position at which the insulating member 130 may be attached.

For example, an edge of the insulating member 130 may be aligned with the alignment mark 110. According to the embodiments, when the insulating member 130 is attached to the accommodating part 21, the position at which the insulating member 130 is attached to the accommodating part 21 may be determined by the alignment mark 110.

According to the embodiments, the length d2 of the insulating member 130 may be formed shorter than a length d1 of a major axis, i.e., a length, of the sealing part 24.

Similarly, when the adhesive member 120 is attached to the accommodating part 21, the position at which the adhesive member 120 should be attached to the accommodating part 21 may be determined by the alignment mark 110. For example, an edge of the adhesive member 120 may be aligned with the alignment mark 110. According to some embodiments, a length d3 of the adhesive member 120 may be shorter than the major axis length d1, i.e., the length, of the sealing part 24.

For a general battery case produced in large quantities, an insulating member may be manually attached to a sealing part of the battery case. As such, the position of the insulating member may vary among battery cases. Further, the insulating member may generally have a length identical to that of the major axis of the sealing part. Therefore, for such a general battery case, when the insulating member is incorrectly attached to the sealing part, a portion of the insulating member extends past the sealing part, while a remaining portion of the insulating member covers only a portion of the sealing part. As a result, the productivity and reliability of the secondary battery may be degraded.

Accordingly, according to the embodiments, the alignment mark 110 may be formed on at least one side of the sealing part 24. The insulating member 130 and the adhesive member 120 may be attached to the sealing part 24 in alignment with the alignment mark 110, thereby addressing the issues described above.

The alignment mark 110 shown in FIGS. 1 and 2, may include at least two alignment marks 110, respectively formed at upper and lower sides, e.g., spaced from opposing edges, of the sealing part 24 to which the insulating member 130 is attached. However, the alignment marks 110 may be disposed at other suitable positions, according to the embodiments.

The sealing part 24 may include opposing parallel, first and second sides 24a and 24b, and a third side 24c extending between and connecting the first and second sides 24a and 24b. At least one alignment mark 110 may be formed on each of the first, second, and third sides, 24a-24c. The insulating member 130 may be attached to the sealing part 24 based on the at least one alignment mark 110. The insulating member 130 may be attached at a predetermined position of the sealing part 24 that is the same for each battery case. Although the alignment mark 110 is in the shape of a dotted line in the figures, the alignment mark 110 may include various shapes.

Referring back to FIG. 1, according to the embodiments, a non-insulating part X of the sealing part 24 may extend past one or more edges of the insulating member 130 that is aligned with the alignment mark 110 and attached to the sealing part 24. For example, the non-insulating part X may be on at least one side of the sealing part 24. The non-insulating part X may extend outside of, i.e., past, the alignment mark 110.

The non-insulating part X may be a region of the sealing part 24, which is not surrounded, i.e., covered, by the insulating member 130. As shown in the figures, the metal layer 27 of the non-insulating part X is exposed. The non-insulating part X may be a region physically fastened to a device (not shown). As the non-insulating part X may be physically fastened to the device, the exposed metal layer 27 in the non-insulating part X may avoid causing a short circuit, unlike other regions of the sealing part 24.

In the general battery case structure, the insulating member covers the non-insulating part X. As a result, the portion of the insulating member covering the non-insulating part X may be ripped when the non-insulating part X is fastened to the device, or the like.

According to the embodiments, the non-insulating member X may not cover the non-insulating part X fastened to the device. Thus, damage to the insulating member 130 may be avoided when the non-insulating member X is fastened to the device.

Referring to FIG. 3, the pouch-type secondary battery 100 may include the electrode assembly 30 and the battery case 20. The electrode assembly 30 and an electrolyte may be retained in the accommodating part 21 inside of the battery case 20. The electrode assembly 30 may include first and second electrode tabs 31 and 32, respectively connected to the first and second electrode plates. The first and second electrode tabs 31 and 32 may extend outside of the electrode assembly 30. For example, the first and second electrode plates may be positive and negative electrode plates, respectively. The first electrode tab 31 may be coupled to the positive electrode plate and function as a positive electrode tab, and the second electrode tab 32 may be coupled to the negative electrode plate and function as a negative electrode tab.

Electrochemical energy may be generated through movement of ions or electrons between the first and second electrode plates. The electrochemical energy may be transferred outside of the electrode assembly 30 through the first and second electrode tabs 31 and 32. Each of the first and second electrode tabs 31 and 32 may include a lead film 33.

The electrode assembly 30 may be manufactured by various methods, including winding together a stack including the first electrode plate, the second electrode plate, and the separator.

The battery case 20 may include a main body 22, which includes the accommodating part 21, and a cover 23, connected to the main body 22 and covering the accommodating part 21. The pouch-type secondary battery 100 may be manufactured by disposing the electrode assembly 30 and the electrolyte in the accommodating part 21 and thermally bonding edges 22a and 23a of the main body 22 and the cover 23, respectively. It should be understood that the sealing part 24 includes the bonding edges 22a and 23a. The main body 22 and the cover 23 may be adhered tightly to each other. The shape of the accommodating part 21 may correspond to the shape of the electrode assembly 30. The accommodating part 21 may be formed in the main body 22 through a deep drawing process including forming a hollow container (without a joint) using a flat plate.

The battery case 20 may include a plurality of layers including an internal resin layer 26', the metal layer 27 and an external resin layer 26. The internal resin layer 26', the metal layer 27 and the external resin layer 26 may be sequentially laminated. The internal resin layer 26' may directly contact the electrode assembly 20, and the external resin layer 26 may form the outermost surface of the battery case 20. The internal and external resin layer 26' and 26 may prevent an electrical short circuit, and the like. The internal and external resin layer 26' and 26 may include a polymer resin or the like, which is a non-conductor. The metal layer 27 may be between the internal and external resin layer 26' and 26, and may provide a predetermined mechanical strength. For example, the metal layer 27 may include aluminum or the like.

When the first and second electrode tabs 31 and 32 extend outside of the battery case 20, the first and second electrode tabs 31 and 32 may interfere with the thermal bonding of the sealing part 24. Thus, the lead films 33 may be securely positioned on the sealing part 24 of the battery case 20, such that the sealing force of the sealing part 24 is not decreased.

Particularly, in the pouch-type secondary battery according to the embodiments, the alignment mark 110 can ensure that the insulating member 130 is always attached to the sealing part 24 at a correct position of the sealing part 24. For example, the insulating member 130 may be wholly positioned on the sealing part 24, when an edge of the insulating member is aligned with the alignment mark 110. Thus, workability may be improved and a failure rate may be minimized.

According to some embodiments, a non-insulating part X (FIG. 1) of the sealing part 24 may extend past one or more edges of the insulating member 130 (aligned with the alignment mark 110 and attached to the sealing part 24). The non-insulating part X may be a region physically fastened to a device (not shown). According to the embodiments, the insulating member 130 may not extend to the region fastened to the device. As a result, a risk of damage to the insulating member 130 is damaged when the non-insulating part X is fastened to the device may be minimized.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A secondary battery, comprising:
an electrode assembly, the electrode assembly including first and second electrode plates and a separator interposed between the electrode plates;
a battery case, the battery case including an accommodating part and a sealing part formed along an edge of the accommodating part, the accommodating part retaining the electrode assembly;
an insulating member attached to the sealing part, the insulating member covering and insulating the sealing part; and
an alignment mark on at least one side of the sealing part, the alignment mark identifying a position on the sealing part at which an edge of the insulating member is aligned,
wherein a non-insulating part of the sealing part is continuously exposed from the edge of the insulating member to an end of the sealing part.

2. The secondary battery according to claim 1, wherein the exposed non-insulating part is a region of the sealing part physically fastened to an external device.

3. The secondary battery according to claim 1, wherein the exposed non-insulating part is outside of the alignment mark and extends to an edge of the battery case, the exposed non-insulating part protrudes beyond a bottom of the battery case.

4. The secondary battery according to claim 1, further including an adhesive member interposed between the sealing part and the insulating member, the adhesive member attaching the sealing part and the insulating member to each other.

5. The secondary battery according to claim 4, wherein the adhesive member includes an insulative double-faced tape, and a length of the adhesive member is shorter than a length of the sealing part.

6. The secondary battery according to claim 4, wherein a length of the adhesive member is shorter than the length of the sealing part.

7. The secondary battery according to claim 6, wherein the adhesive member extends substantially along the length of the sealing part.

8. The secondary battery according to claim 1, wherein a length of the insulating member is shorter than a length of the sealing part, the insulating member overlapping a majority of a sidewall of the accommodating part.

9. The secondary battery according to claim 8, wherein a length of the insulating member extends substantially along the length of the sealing part.

10. The secondary battery according to claim 9, wherein the non-insulating part of the sealing part extends past another edge of the insulating member, the other edge opposite the edge.

11. The secondary battery according to claim 1, wherein the alignment mark includes at least two alignment marks respectively spaced from opposing ends of at least one side of the sealing part.

12. The secondary battery according to claim 1, wherein the alignment mark has a shape of a dotted line.

13. The secondary battery according to claim 1, wherein the insulating member has a L-shaped cross section, the insulating member overlapping a portion of each of the sealing part and the accommodating part of the battery case.

14. The secondary battery according to claim 13, wherein the portion of the sealing part overlapped by the sealing member is longer than a portion of the sealing part exposed by the sealing member.

15. The secondary battery according to claim 1, wherein the alignment mark overlaps a sidewall of the accommodating part when the sealing part is folded toward the accommodating part, the edge of the insulating member being aligned with the alignment mark to expose a portion of each of the sealing part and the accommodating part.

16. The secondary battery according to claim 15, wherein the non-insulating part is the exposed portion of the sealing part, the insulating member overlapping a majority of the sidewall of the accommodating part.

17. The secondary battery according to claim 15, wherein a terminal edge of the non-insulating part is horizontally spaced apart from a terminal edge of the insulating member along a longitudinal direction of the insulating member.

18. The secondary battery according to claim 1, wherein the non-insulating part of the sealing part partially overlaps a sidewall of the accommodating part, the insulating member overlapping a majority of the sidewall of the accommodating part.

19. The secondary battery according to claim 1, wherein the non-insulating part includes a first non-insulating part adjacent to a bottom of the battery case and a second non-insulating part adjacent to an electrode terminal, the first and second non-insulating parts being separated by the insulating member and being on opposite sides of the battery case.

20. The secondary battery according to claim 1, wherein the sealing part includes a metal layer between two insulating layers, the exposed non-insulating part including a portion of the metal layer that is exposed to an exterior of the battery case.

\* \* \* \* \*